United States Patent
Ooi et al.

(10) Patent No.: US 8,386,806 B2
(45) Date of Patent: Feb. 26, 2013

(54) INTEGRATED POWER MANAGEMENT LOGIC

(75) Inventors: Giap Yong Ooi, Penang (MY); Wai Shin Lau, Penang (MY)

(73) Assignee: Intel Corporation, Santa Clara, CA (US)

( * ) Notice: Subject to any disclaimer, the term of this patent is extended or adjusted under 35 U.S.C. 154(b) by 1270 days.

(21) Appl. No.: 11/958,159

(22) Filed: Dec. 17, 2007

(65) Prior Publication Data

US 2009/0158071 A1    Jun. 18, 2009

(51) Int. Cl.
*G06F 9/46* (2006.01)

(52) U.S. Cl. ........ 713/300; 713/310; 713/320; 713/321; 713/322; 713/323; 713/324; 713/330; 713/340

(58) Field of Classification Search .................. 713/300, 713/310, 320–324, 330, 340
See application file for complete search history.

(56) References Cited

U.S. PATENT DOCUMENTS

| | | | |
|---|---|---|---|
| 5,590,342 A * | 12/1996 | Marisetty ...................... | 713/324 |
| 6,829,547 B2 * | 12/2004 | Law et al. ...................... | 702/64 |
| 6,901,572 B1 * | 5/2005 | Dougherty et al. ........... | 716/103 |
| 7,372,682 B2 * | 5/2008 | Chapuis ......................... | 361/62 |
| 7,702,479 B2 * | 4/2010 | Cheemalapati et al. ...... | 702/108 |
| 7,760,574 B2 * | 7/2010 | Chen et al. ..................... | 365/226 |
| 7,782,029 B2 * | 8/2010 | Chapuis et al. ............... | 323/267 |
| 7,877,618 B2 * | 1/2011 | Lewis et al. ................... | 713/310 |
| 2002/0195997 A1 * | 12/2002 | Peek et al. ..................... | 320/134 |
| 2003/0204342 A1 * | 10/2003 | Law et al. ....................... | 702/65 |
| 2005/0149768 A1 * | 7/2005 | Kwa et al. ...................... | 713/300 |
| 2005/0265437 A1 * | 12/2005 | Yeung et al. .................. | 375/224 |
| 2006/0015616 A1 * | 1/2006 | Chapuis et al. ............... | 709/225 |
| 2007/0143640 A1 * | 6/2007 | Simeral et al. ................ | 713/320 |
| 2008/0072080 A1 * | 3/2008 | Chapuis et al. ............... | 713/300 |
| 2008/0074373 A1 * | 3/2008 | Chapuis et al. ................. | 345/89 |

* cited by examiner

*Primary Examiner* — M Elamin

(74) *Attorney, Agent, or Firm* — Schwabe, Williamson & Wyatt, P.C.

(57) ABSTRACT

A device and system are disclosed. In one embodiment the device includes a programmable power supply management logic. The programmable power supply management logic is capable of managing a plurality of voltage regulators present in a computer system. Additionally, the power supply management logic is integrated into an input/output complex in the computer system.

11 Claims, 2 Drawing Sheets

INTEGRATED POWER MANAGEMENT LOGIC

FIELD OF THE INVENTION

The invention relates to managing voltage regulators on a motherboard from a centralized location.

BACKGROUND OF THE INVENTION

Single function power sequencing management integrated circuits are no longer practical on today's computer system circuit boards (e.g. motherboards). Most circuit boards now utilize several multi-voltage integrated circuits, each with a power sequencing requirement. Devices with smaller transistor geometries require lower power supply voltages with increased current. It is often a circuit board design requirement to use a single point of load from the power supply for each multi-voltage integrated circuit. Consequently, the number of voltage regulators used on a circuit board is increasing. With the increase in the number of power supply rails, and with the need for multiple sequencing arrangements, power sequencing management becomes more complex. As power sequencing management logic becomes more complex, the overall circuit board design costs increase because there is an increase in complexity of the power management logic and there is an increase in the number of power management logic devices on the circuit board. Furthermore, due to the increase in the size (i.e. complexity) and number of power management logic devices on a given circuit board, the board area requirements for the power management logic devices increase as well.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of a device and system with integrated and centralized power management logic are described. In the following description, numerous specific details are set forth. However, it is understood that embodiments may be practiced without these specific details. In other instances, well-known elements, specifications, and protocols have not been discussed in detail in order to avoid obscuring the present invention.

Figure 1:
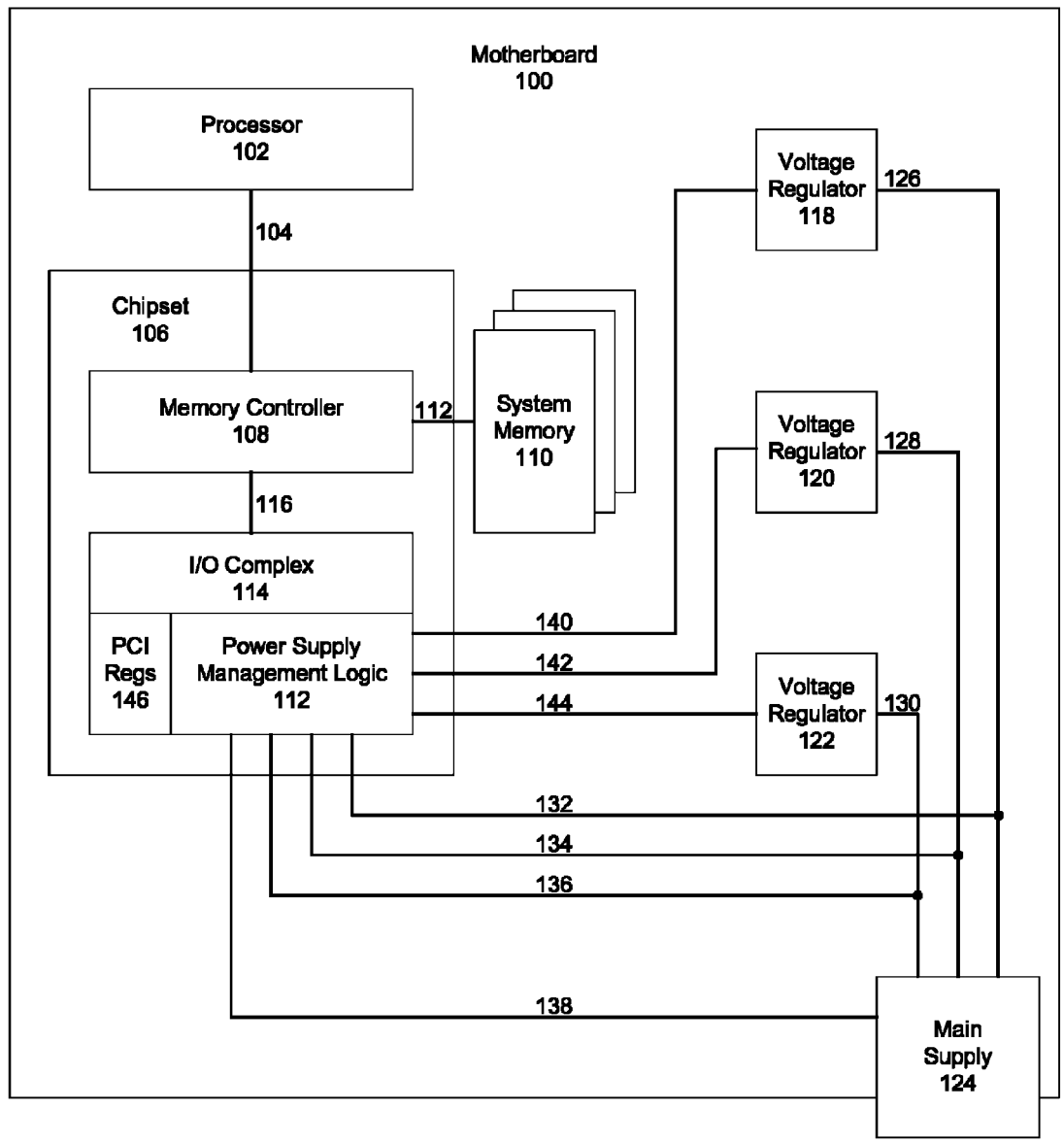
FIG. 1 describes one embodiment of a computer system that includes integrated power sequencing management logic to manage a plurality of power supplies in the computer system.

FIG. 1 describes one embodiment of a computer system that includes integrated power sequencing management logic to manage a plurality of power supplies in the computer system. The system includes a motherboard 100. Motherboard 100 is a printed circuit board that has multiple attached computer system components. Some components may be soldered and permanently attached to the motherboard, while others may be plugged in through expansion card slots that are affixed to the motherboard.

In many embodiments, a processor 100 resides in the computer system on the motherboard. Processor 102 is coupled to an interconnect 104 in many embodiments. Interconnect 104 may be any type of interconnect that can send data from one device to another. In some embodiments, interconnect 104 includes data, address, clock, and control lines used to transmit data (these lines are not shown). In different embodiments, the processor may include one or more processor cores. In some multiprocessor embodiments, there are multiple processor dies coupled together, each including one or more cores per die (the architecture for processor cores on multiple dies is not shown in FIG. 1). In different embodiments, the processor 102 may be any type of central processing unit (CPU) designed for use in any form of personal computer, handheld device, server, workstation, or other computing device available today.

A chipset 106 is present in the system, in many embodiments. In some embodiments, the chipset includes a memory controller 108 that is coupled to processor 102 through interconnect 104. Memory controller 108 is also coupled to system memory 110 through interconnect 112. In different embodiments, system memory 108 may be comprised of specific types of dynamic random access memory (DRAM), such as, for example, double data rate (DDR) synchronous DRAM. In other embodiments, system memory 110 may be comprised of other types of memory devices. In some embodiments, the memory controller is integrated in processor 100 (not shown).

Memory controller 108 is also coupled to input/output (I/O) complex 114 through interconnect 116. In many embodiments, I/O complex 114 includes one or more I/O host controllers. For example, one such I/O host controller integrated into I/O complex 114 may be a universal serial bus (USB) host controller.

In many embodiments, power supply management logic 112 is located within I/O complex 114. The detailed implementation of power supply management logic 112 is located below in regard to the discussion of FIG. 2. Power supply management logic 112 manages one or more voltage regulators located on motherboard 100. In many embodiments, this includes management of voltage regulators 118, 120, and 122, which are coupled to the motherboard and supply certain components on the motherboard. In many embodiments, power supply management logic 112 may also provide management for the main power supply 124 that feeds power to voltage regulators 118, 120, and 122 through power rails 126, 128, and 130 respectively. In different embodiments, power supply management logic 112 may implement functions to manage one or more of the voltage regulators for reset generation, fault interrupt generation, and general management and sequencing of the individual voltage regulators, among other functions.

Power rails 126, 128, and 130 may run at any one of a number of potential voltages, such as 0.9V, 1.0V, 1.05V, 1.2V, 1.25V, 1.5V, 1.8V, 3.3V, 5V, 12V, and −12V among others. Power supply management logic 112 monitors each of the power rails through monitoring lines 132, 134, and 136. Power supply management logic 112 may also monitor the main supply through monitoring line 138. In many embodiments, there are many more power rails than just rails 126, 128, and 130. The three rails shown in FIG. 1 are just utilized as an example.

Additionally, power supply management logic 112 also sends one or more control signals to power supplies 118, 120, and 122 through control signal lines 140, 142, and 144. In many embodiments, power supply management logic 112 can send an enable/disable signal across each of control signal lines 140, 142, and 144 to enable/disable voltage regulators 118, 120, and 122, respectively. Furthermore, power supply management logic 112 can enable/disable each of the voltage regulators using control signal lines 140, 142, and 144 in a timed sequence to provide, for example, a power up sequence for all (or many) voltage regulators on motherboard 100. In the same regard, using another example, the same (or a different, or a reverse) sequence and timing can be used to power down all (or many) of the voltage regulators on motherboard 100.

Figure 2:
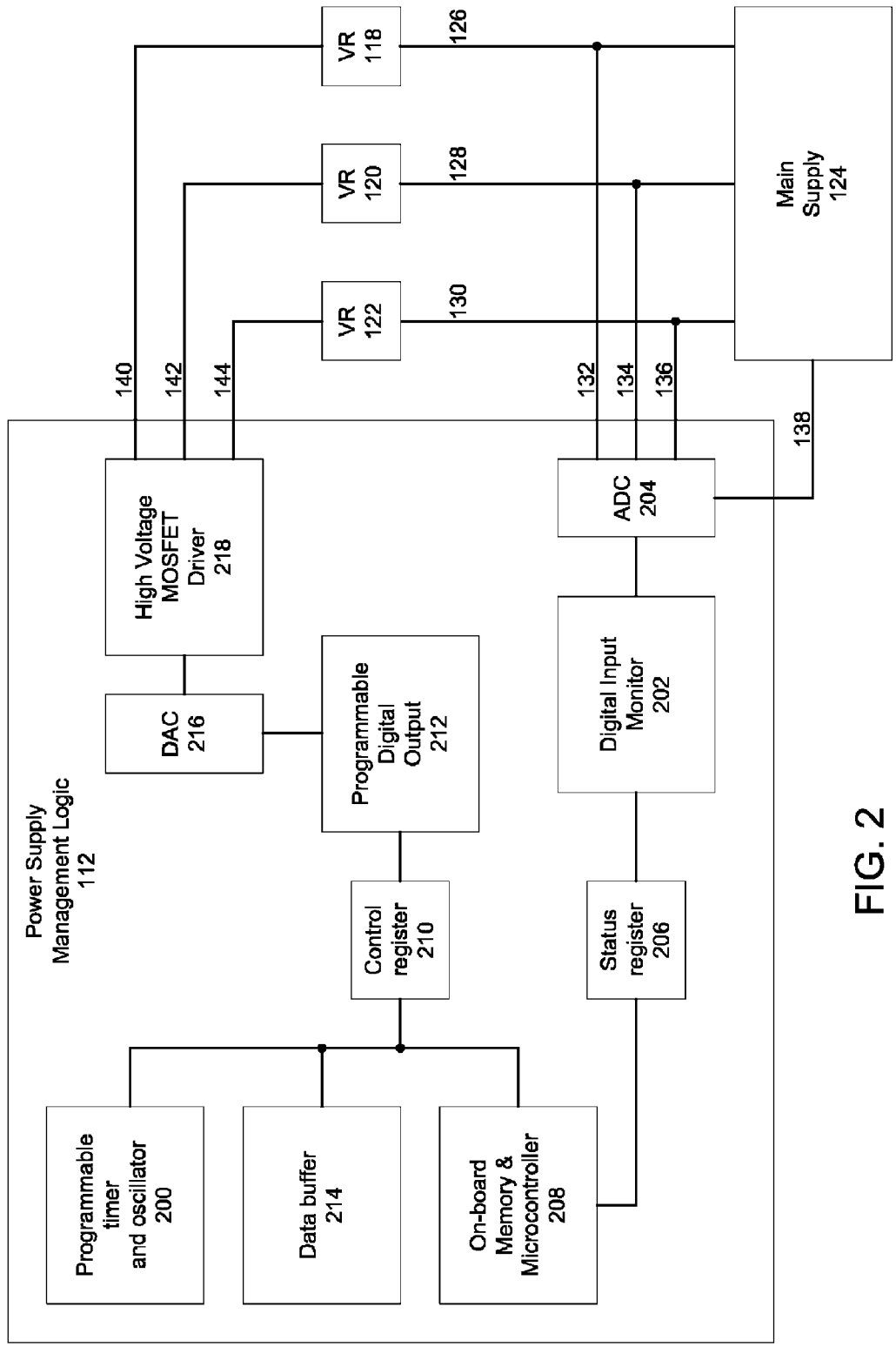
FIG. 2 describes a detailed view of one embodiment of the power supply management logic.

FIG. 2 describes a detailed view of one embodiment of the power supply management logic. In many embodiments, as discussed above, the power supply management logic 112 is coupled to a data interconnect 140. The data interconnect 140 is also coupled to power supplies 118, 120, and 122. The data interconnect allows transmission of information between the power supply management logic 112 and the power supplies. The power supply management logic 112 is also coupled to power rails 126, 128, and 130.

Specifically, the power supply management logic 112 includes a programmable timer and oscillator unit 200. In many embodiments, the programmable timer and oscillator unit 200 includes an oscillator to generate an oscillating signal to utilize for the timers. In many embodiments, the programmable timer and oscillator unit 200 includes multiple programmable timers. Each programmable timer may be programmed on the order of micro-seconds (μs) up to entire seconds. The programmable timers may be utilized for controlling power supply sequence delays, reset signal pulse stretching, and a watchdog timer. For example, if, on system reset, power supply 118 must be enabled to supply power one second prior to power supply 120, the programmable timer and oscillator unit may provide the timing delay for an enable signal being sent to power supply 120, as opposed to no delay for enabling power supply 118.

In many embodiments, a digital input monitor 202 is also integrated within the power supply management logic 112. The digital input monitor 202 monitors the power supply rails located on the motherboard. For example, power rails 126, 128, and 130 are coupled to monitoring lines 132, 134, and 136, respectively. The monitoring lines couple an analog to digital converter (ADC) 204, located within the power supply management logic 112, to the power rails. ADC 204 converts the analog voltage levels seen on power rails 126, 128, and 130 to digital data equivalents and sends that information to the digital input monitor 202.

In many embodiments, the digital input monitor 202 can monitor any over voltage and under voltage conditions on any of the power rails using programmable threshold precision comparators (not shown). The programmable threshold precision comparators may be programmed with a high threshold value and a low threshold value per power rail. The digital input monitor 202 (or more specifically, one or more of the programmable threshold precision comparators within the digital input monitor) may report any over or under voltage conditions to a status register 206.

The status register 206 may be utilized for saving the status of each power rail on the motherboard. For example, when a specific power rail is turned on and in good condition (i.e. there are no over or under voltage conditions), a bit within the register associated with that specific power rail may be set to "1". In many embodiments, this bit is set by the digital input monitor, per power rail, as it receives the voltage information per power rail from the ADC 204. In many embodiments, when the power rail is turned off, or exhibiting an over or under voltage condition, the bit is set to "0". In many different embodiments, the status register may also be utilized to report other power sequence signals such as reset in, power supply good, and shutdown signals.

An on-board memory device and microcontroller 208 also resides within the power supply management logic 112, in many embodiments. In many embodiments, the memory device is an electronic erasable programmable read only memory (EEPROM). The memory device may store code associated with the management of the power supplies and the microcontroller may be capable of running the code stored within the memory device to dynamically manage the power supplies within the computer system. In many embodiments, the memory device and microcontroller 208 may be programmed to monitor one or more of the power supply rails.

In many embodiments, the memory device and microcontroller 208 may monitor the rails by monitoring the status register to determine, per rail, whether a rail is turned on and in good condition or turned off or in a bad condition (such as in an over voltage or under voltage state). Based on the power rail state input information, the memory device and microcontroller 208 may utilize specific programmed logic code to respond with management decisions to send to one or more of the voltage regulators in the computer system. For example, during a power up sequence, the sequence utilized to turn on the voltage regulators may be derived at least partially using information from the status register 206 as to whether each power rail is operating in good condition.

In many embodiments, the sequence used to power up voltage regulators 118, 120, and 122 is originally sent to control register 210. In many embodiments, the control register 210 associates at least one bit per voltage regulator. When a "1" is written to the control register bit associated with a specific voltage regulator, a programmable digital output unit 212 will read this as a command to enable the respective voltage regulator. Alternatively, when a "0" is written to the control register bit associated with the specific voltage regulator, the programmable digital output unit 212 will read this as a command to disable the respective voltage regulator.

A part from the power up/down sequencing of voltage regulators, the control register 210 also may aid in power budgeting processes, power failure recovering modes, as well as any other processes and modes that requires control of the voltage regulators in the system.

In some embodiments, the memory device and microcontroller 208 will write directly to the control register 210 for enabling and disabling voltage regulators. In other embodiments, the programmable timer and oscillator will write to the control register 210 to precisely control the timing and sequence of enabling or disabling one or more of the voltage regulators.

In many of the embodiments where the programmable timer and oscillator 200 writes to the control register 210, the memory device and microcontroller 208 will have previously programmed the programmable timer and oscillator 200 to customize the times at which the programmable timer and oscillator 200 writes to one or more of the bits in the control register 210. Thus, the memory device and microcontroller 208 is capable of programming the programmable timer and oscillator unit 200 to the specific timings required by the multiple voltage regulators on the motherboard during a reset, power on, or other power-related system event.

In other embodiments, the programmable timer and oscillator 200 sends the timing data back to the memory device and microcontroller 208 and the microcontroller then utilizes the input timing data to determine when the microcontroller should write to the control register.

In many embodiments, a data buffer 214 is utilized by the memory device and microcontroller 208 as a data storage device for programmable firmware or for executing program code from the microcontroller during execution. In some embodiments, the memory device and microcontroller 208 receives program instructions for timing per power supply as well as optimal voltage levels and/or acceptable voltage variances per rail from one or more basic input/output system (BIOS) instructions or other user input. This information may be stored within the data buffer, within the memory device in 208, or within another device not shown in FIG. 2.

The programmable digital output unit 212 takes the information sent from the memory device and microcontroller 208 and/or the programmable timer and oscillator unit 200 and outputs the information to be sent to one or more of the voltage regulators on the motherboard to digital to analog converter (DAC) 216. The DAC 216 converts the digital output of programmable digital output unit 212 to the equivalent analog signal and sends the analog version of each voltage regulator control signal to a high voltage metal oxide semiconductor field effect transistors (MOSFET) driver 218.

The MOSFET driver drives the analog signal for each control signal line 140, 142, and 144 which allows the enabling or disabling of each of the voltage regulators (118, 120, and 122) on the motherboard. In these embodiments, the MOSFET is an N-channel MOSFET, which is utilized for power switching to drive the control signal to an enabled state. The N-channel MOSFET effectively can turn a power supply on or off this way.

The control signals sent to one or more of the voltage regulators (118, 120, 122) will reach the targeted voltage regulator (or regulators) as an analog signal that enables or disables the DC-DC converter in the respective voltage regulator. This allows correct sequencing of the multiple power supplies on the motherboard to allow the generation of a reset signal.

For example, in one embodiment, voltage regulator 118 requires enabling first, followed by a 200 μsecond delay, followed by enabling voltage regulator 120, followed by a 1 second delay, followed by enabling voltage regulator 122. In this example, the memory device and microcontroller 208 sets the bit associated with voltage regulator 118 to "1" in the control register 210. Then the memory device and microcontroller 208 utilizes a 200 μsecond delay generated by the programmable timer and oscillator unit 200 (which may be previously programmed by the memory device and microcontroller 208 or programmed on the fly) to delay prior to setting the bit associated with voltage regulator 120 to "1" in the control register 210. Then the memory device and microcontroller 208 utilizes a 1 second delay also generated by the programmable timer and oscillator unit 200 to delay prior to setting the bit associated with voltage regulator 122 to "1" in the control register 210. The programmable digital output unit 212 monitors the control register 210. When each of these bits are set in the control register, the programmable digital output unit 212 sends the digital version of the enable signal for the respective voltage regulators. The DAC 216 receives these digital enable signals with the respective delays in between and converts each one to the analog equivalent. The DAC then sends the analog equivalent signals to the high voltage MOSFET driver 218, which in turn drives an enable signal across control signal line 140, then after a 200 μsecond delay, drives an enable signal across control signal line 142, and finally, after a 1 second delay, drives an enable signal across control signal line 144.

Thus, embodiments of a device and system with integrated and centralized power management logic are described. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A device, comprising:
a programmable power supply management logic to manage a plurality of voltage regulators present in a computer system, wherein the power supply management logic is integrated into an input/output complex in the computer system, the programmable power supply management logic including:
one or more configuration registers to store a plurality of corresponding control bits for the plurality of voltage regulators;
a plurality of programmable timers, each timer to provide a timing sequence for a corresponding one of the plurality of voltage regulators;
a microcontroller coupled with the plurality of programmable timers and the one or more configuration registers to set the corresponding control bits of the voltage regulators over a time period in accordance with delays provided by the corresponding timing sequences of the voltage regulators; and
an output arrangement coupled with the one or more configuration registers to output an enable signal for a corresponding one of the voltage regulators, in response to the corresponding one of the control bits being set, for powering on the computer system.

2. The device of claim 1, further comprising a digital input monitor to monitor a plurality of main power supply rails.

3. The device of claim 2, wherein the digital input monitor is further operable to monitor over-voltage and under-voltage conditions on each of the plurality of main power supply rails.

4. The device of claim 3, wherein the digital input monitor further comprises a plurality of programmable threshold precision comparators.

5. The device of claim 1, wherein the programmable power supply management logic further comprises a programmable analog monitoring unit to monitor a plurality of supply voltages provided by the plurality of power supplies.

6. The device of claim 5, wherein the microcontroller is further configured to utilize the monitoring results from the programmable analog monitoring unit, in setting the control bits in the one or more configuration registers.

7. A system, comprising:
a motherboard;
a plurality of voltage regulators coupled to the motherboard;
a main power supply coupled to the motherboard, wherein the main power supply supplies power to the plurality of voltage regulators;
a battery coupled to the main power supply; and
an input/output (I/O) complex coupled to the motherboard, the I/O complex comprising an integrated programmable power supply management logic unit to manage the plurality of voltage regulators, the programmable power supply management logic including:
a plurality of programmable timers, each timer to provide a timing sequence for a corresponding one of the plurality of voltage regulators;
one or more configuration registers configured to store a plurality of corresponding control bits for the plurality of voltage regulators;
a microcontroller coupled with the plurality of programmable timers and the one or more configuration registers to set the corresponding control bits of the voltage regulators over a time period in accordance with delays provided by the corresponding timing sequences of the voltage regulators; and an output arrangement coupled with the one or more configuration registers to output an enable signal for a corresponding one of the voltage regulators, in response to the corresponding one of the control bits being set, for powering on the computer system.

8. The system of claim 7, further comprising a digital input monitor to monitor a plurality of main power supply rails; and monitor over-voltage and under-voltage conditions on each of the plurality of main power supply rails.

9. The system of claim 8, wherein the digital input monitor further comprises a plurality of programmable threshold precision comparators.

10. The system of claim 7, wherein the programmable power supply management logic further comprises a programmable analog monitoring unit to monitor a plurality of supply voltages provided by the plurality of power supplies.

11. The system of claim 10, wherein the microcontroller is further configured to utilize the monitoring results from the programmable analog monitoring unit and provide a sequence for each of the plurality of power supplies, in setting the control bits in the one or more configuration registers.

* * * * *